Nov. 4, 1947. E. A. THOMPSON 2,430,258
ROTARY HYDRAULIC COUPLING OF THE TURBINE TYPE
Original Filed Feb. 5, 1940 3 Sheets-Sheet 2
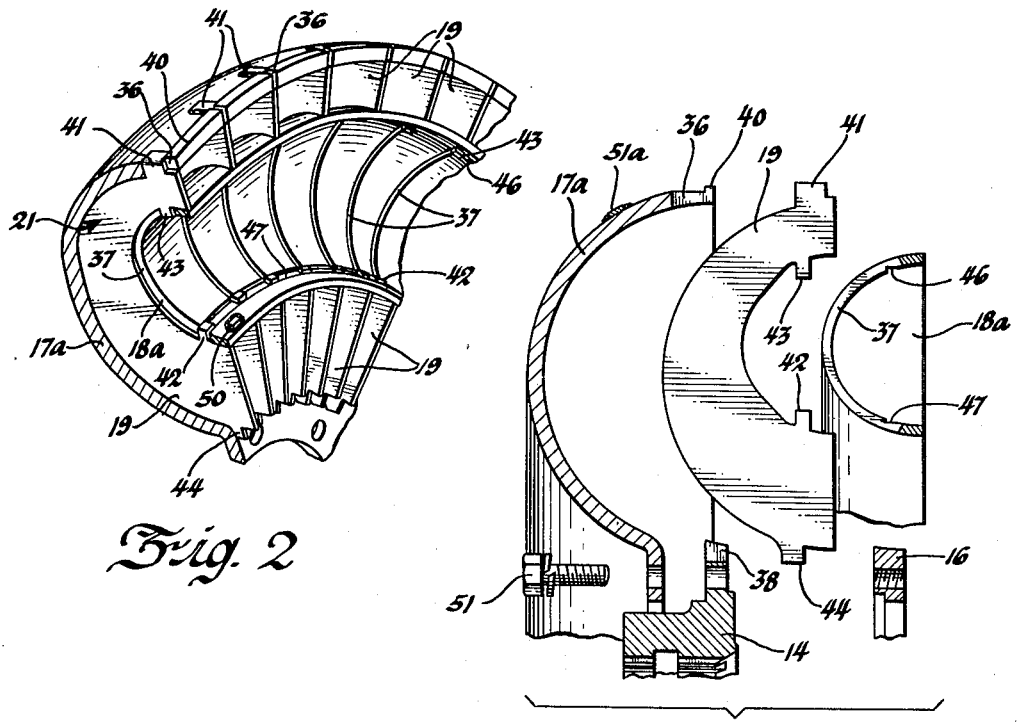
Fig. 2
Fig. 3
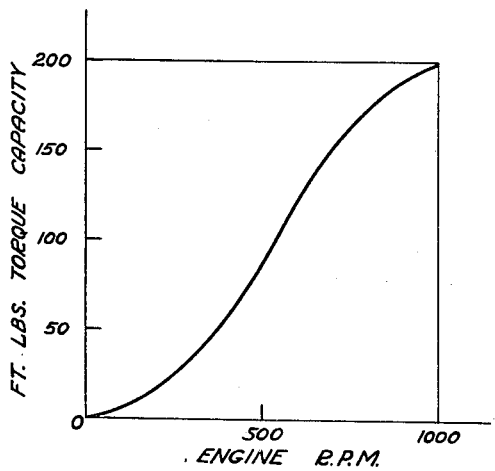
Fig. 4
Inventor
Earl A. Thompson
By
Blackmore, Spencer & Flint
Attorneys Inventor
Earl A. Thompson
By
Blackmore, Spencer & Flint
Attorneys Patented Nov. 4, 1947

2,430,258

UNITED STATES PATENT OFFICE 2,430,258

ROTARY HYDRAULIC COUPLING OF THE TURBINE TYPE

Earl A. Thompson, Bloomfield Hills, Mich., assignor to General Motors Corporation, Detroit, Mich., a corporation of Delaware Original application February 5, 1940, Serial No. 317,348, now Patent No. 2,357,295, dated September 5, 1944. Divided and this application February 17, 1941, Serial No. 379,248

8 Claims. (Cl. 60—54)

The present invention relates to power devices for transmitting variable torque through turbine bladed rotors placed adjacent each other, and operating by toroidal circulation of fluid in a closed toroidal turbine circuit, and more particularly in power devices for motor vehicles. This is a divisional application for Letters Patent of my United States application Serial No. 317,348, filed February 5, 1940, now Patent No. 2,357,295, for improvements in Turbine drive mechanisms.

A feature of the present invention is the confining of the fluid power transfer media in a toroidal vaned space, constituting a substantially closed flow circuit for the fluid, without voids or compression and decompression zones.

Another feature of the present invention is the provision of a vane turbine rotor structure in which the ratio of the number of vanes to the volumetric space occupied by the vanes themselves is high, this ratio factor being a measure of fineness, from which important gains in efficiency and low stalling torque are derived. The vanes may be of given flexibility for mounting the mass of the ring structure of the supporting rotor members.

A further feature is the provision of a method of assembly of such fluid turbines utilizing slotted sheet metal stampings of semi-toroidal shape in the slots of which tabbed vanes are inserted, the structure being fastened together by rolling the tabs of the vanes aforesaid, with even pressure applied circumferentially, with mechanical force, supplemented by welding where needed.

The vanes may be of flexible, stamped sheet metal for the reason above stated.

An additional feature is the provision of fluid circuit-closing axial spacer members at the hub portions of the assembly of the rotors of the invention, which clamp the vanes axially into position.

A supplementary feature is the provision of a constantly replenished body of fluid moving dynamically through the turbine device, supplied with means for compelling circulation from and to a supply reservoir having a large heat radiation capacity, while the circulation system is equipped with means to furnish and maintain a given pressure of operating fluid in the working spaces of the turbine device, thereby eliminating voids, frothing and gasification of the fluid.

The terminology used further herein to describe the turbine members or elements will name that one of the members coupled to the source of power as the "impeller" and that one coupled to the load shaft as the "rotor."

These objects and features of the invention, in combination, and additional features further described and combined with them, contribute to the attainment of the objects afore-mentioned, and other objects as appear herein.

An individual embodiment of my invention, which is defined in its full aspects in the appended claims, is shown in the accompanying drawings.

Figure 2 is a perspective view of a sector cut from one of the turbine elements.

Figure 3 is an exploded view of the method of assembly of the vanes of the turbine arrangement, as they appear in Figure 1.

The chart of Figure 4 is a typical power curve of the device of the invention.

Figure 1:
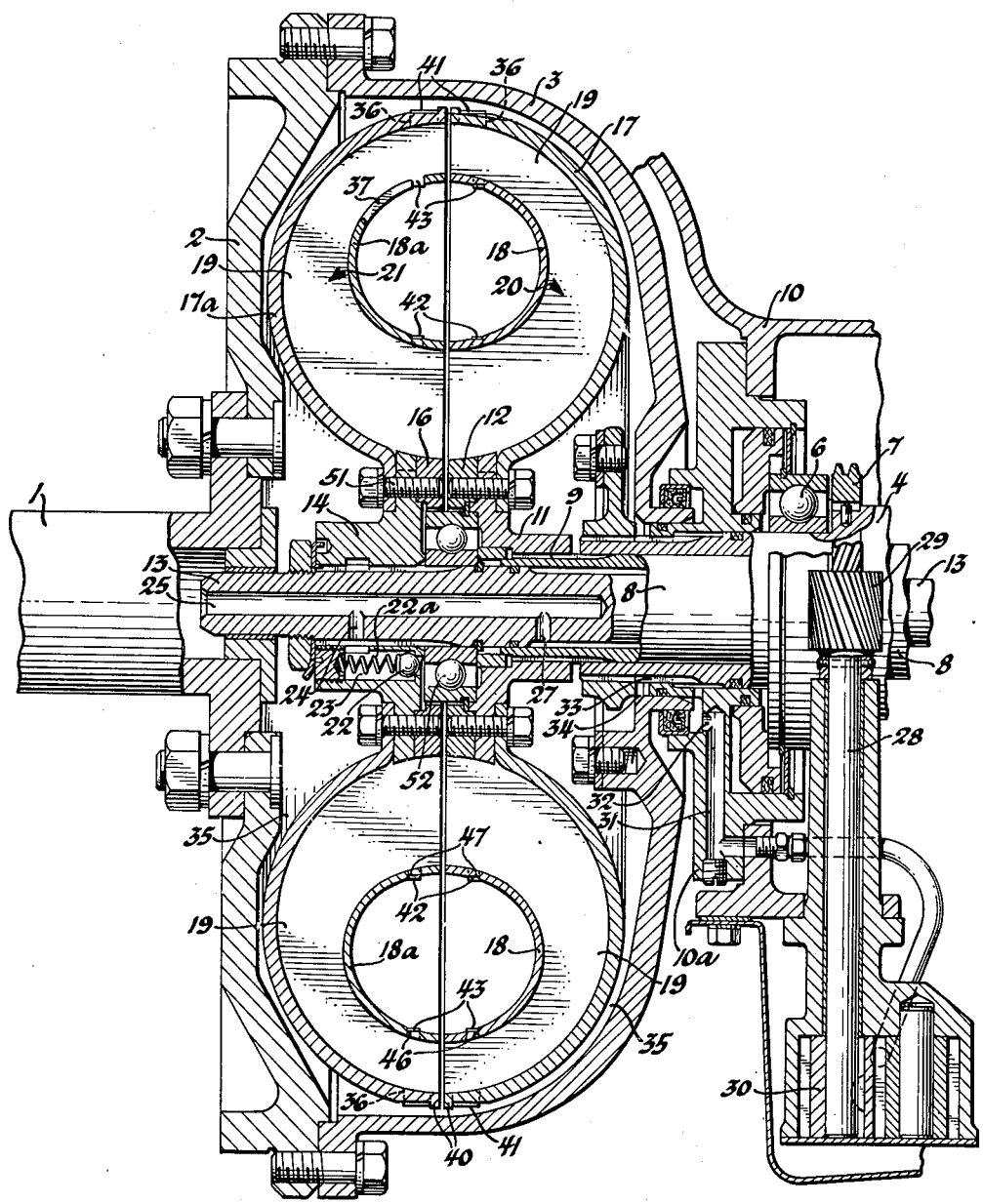
Figure 1 is a longitudinal elevation section of the fluid turbine of the invention with parts broken away, showing the fluid circulation system.
Figures 5, 5A:
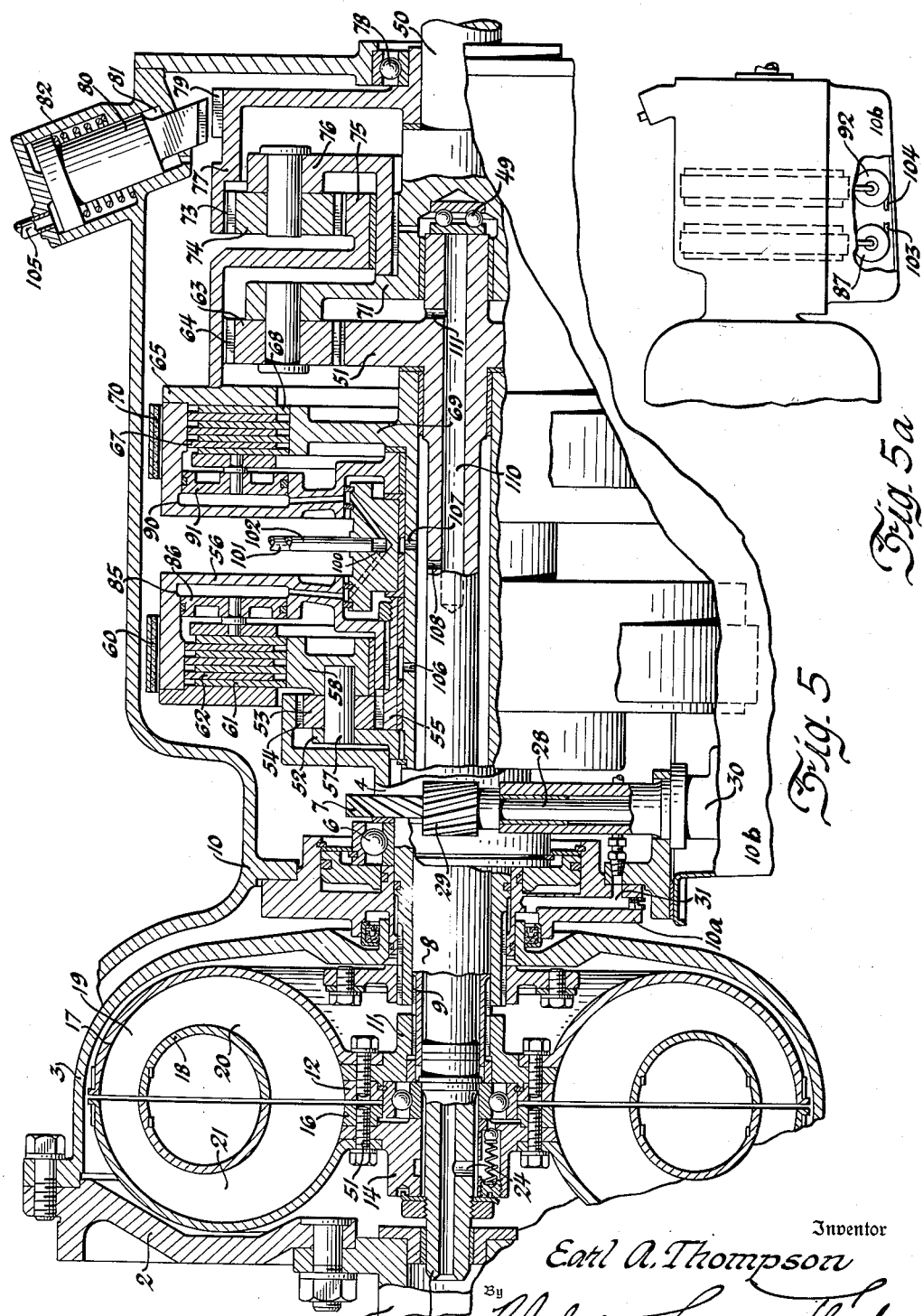

Figure 5 is a vertical section of a transmission driving assembly embodying the invention as described in Figure 1. Figure 5a is a schematic outline of the transmission assembly of Figure 5 showing the transmission brake actuators.

The engine shaft 1 in Figure 1 is connected to flywheel 2 to which is bolted drum 3 attached to hollow shaft 4 supported in bearing 6 of housing 10. Shaft 4 has affixed gear 7 and may drive clutch and gearing mechanism at the right, not involved directly in this invention. The inner solid shaft 13 may be driven directly by said engine-connected drum 3, through gearing at varying speed ratios thereby, or be coupled to shaft 1 as required for a particular drive and as will be understood from the description of Figure 5.

The inner end of hollow shaft 8 is splined at 9 to accommodate hub member 11, the flange of which supports impeller 20 and spacer ring 12. Solid shaft 13 is the output member of the driving assembly, and may be connected directly to output or through gearing cooperating with the gearing aforesaid.

Rotor turbine hub 14 is splined to shaft 13, its flange mounting rotor elements 21 and spacer ring 16.

Spring loaded check valve 22 in passage 23 drilled in hub 14 permits excess fluid pressure within the operating spaces of the turbine device to drain to passages 24, 25, and 27 in shaft 13, thence through the various bearings along shaft 13 back to the lubrication sump. Spring 22a may be set for a predetermined pressure relief value.

Vertical shaft 28 supported in extensions of casing 10 carries gear 29 meshing with gear 7 of hollow-shaft 4 and drives pump assembly 30 located in the lower portion of the casing so as to draw lubricant from the sump. The pump is driven, therefore, directly by the engine.

Pump feed passage 31 in housing 10a delivers oil through the passages 32, 33, and 34 to space 35 so that the turbine impeller and rotor elements 20 and 21 are surrounded with oil and kept filled and under pressure at all times, the check valve 22 relieving excess pressure as described. It will be understood that while engine-connected shaft 4 is rotating, there will be a constantly changing supply of oil for lubrication and for furnishing the operating liquid of the turbine elements 20 and 21. The supply thus recirculating tends to reach a mean operating temperature level quickly and remain there during the running of the mechanism, for the whole sump and casing 10 of the transmission driven by shafts 4 and 13 are adapted to act as radiators of excess heat. It will be noted that the pressure within drum 3 provided by the pump is exerted on the outer flanks of the rotors 17 and 17a to counteract that of the working space which tends to separate them axially.

While it is commonly known to utilize the zonal differences in operating pressures within fluid work turbines for maintaining and relieving the pressures, such devices as injectors and aspirators are subject to variations in the turbine operating conditions, and it is preferred therefore to provide positive circulation of fluid held under pressure established by the operation of the engine and connected parts. My method in practice has been found to avoid the common troubles with voids, overheating, gasification and frothing of the liquid, and the consequent interference with proper operation and life of the mechanism involved.

Attention is directed to the fact that spacer rings 12 and 16 close off the low velocity spaces of the turbine elements, differing from the constructions commonly used, and providing a substantially closed path for toroidal circulation of fluid within the turbine elements.

It should be observed that the pressure values within the fluid turbine working space will be subject to constant variation because of the fact that in a vehicle, for example, the power requirements set up a need for speed variation of the engine. This, in turn, sets up a variation in the pump pressure made available, so that the fluid in the working space is circulating practically all the time, whenever the check valve 22 is being opened and closed.

This effect is, of course, accentuated by leakage through the various bearings of the fluid rotor hubs and shafting.

Turbine impeller element 20 is composed of external semi-torus shell 17 and internal member 18, slotted radially to receive vanes 19 displaced as shown in Figure 2. Similarly, rotor element 21 is made up of shell 17a, internal member 18a and vanes 19. The elements 20 and 21 are identical.

Each vane 19 is cut as shown in Figure 3 with tabs 41, 42, 43, and 44 projecting so as to pass through the slots 36—38 of the shells and slots 37 of the inner members as indicated. The vanes may be cut from sheet metal of predetermined flexibility to cooperate with the mass of the members 18, 18a for torsional vibration dampening purposes.

Each of the external shells 17 and 17a has an external circumferential bead 40 better shown in Figure 3, behind which the tabs 41 of the vanes 19 are bent after being inserted in slots 36 and 38. The tabs 41 are finally rolled flat to the outside contour of the shells 20—21 and may be brazed, soldered or welded, as strength and rigidity require, although rolling will suffice for all practical purposes.

The inner member 18 of the assembly is half ring-shaped, resembling half of a torus, its section, however, being of special contour, for preserving efficiency in guiding the fluid flow around the "eye" of the turbine member.

The piece 18 is slotted radially at 37 from the closed side of the ring to a depth equal to the lateral spacing between the registering inner and outer edges of the vanes so that tabs 42 and 43 may be bent and rolled smoothly within the reentrant portion of the piece. This slotting is shown in the right-hand portion of Figure 3. The tabs are rolled circumferentially in one hand of rotation to preserve dynamic balance. The inner circumferential grooves 46 and 47 accommodate the bent tabs 42 and 43, which after rolling, or other affirming operation, present a relatively smooth surface.

At the inner portion of the shells 20—21, the tabs 44 are mounted in radial slots 38 cut in hubs 11 and 14, the tabs being locked against endwise movement by spacer rings 12 and 16. Bolts 51 thread into the rings 16 and 12, holding the shells 17a and 17 to the hubs 14 and 11. Bearing 52 supports hub 12 on shaft 13.

The method of construction provides exceptional lightness and strength when compared with competitive devices. It has been found in practice that it is not necessary to weld the parts together if sufficient care is taken to dimension the slots and vane thickness, and to use a sheet material for the vanes capable of being bent and rolled for locking in position as described. This obviates the risk of heat warping the accurately aligned parts. It has been found in practice that the stresses in the members are negligible so that after assembly, there is no internal warp of the impeller and rotor elements 20 and 21, which assures efficient operation for an indefinite period. The trueness of the dynamic balance of the turbine elements is assured by this method, so that noises caused by precession of the rotating masses or other variations in the smooth flow of torque are not experienced.

In practice, dynamic unbalance of a rotor assembly may be corrected by weighted tabs such as shown at 50 at Figure 2, spot welded to inner ring 18 or 18a, or to outer shell 17, or 17a, such as indicated at 51a in Figure 3. It is desirable that these units be free from dynamic unbalance. The yield of the flexible vanes may be correlated to the mass values of the rotating parts such as the semi-toroidal rings 18, 18a.

It should be understood that the presence of check valve 22 in hub 14 removes material which disturbs the perfect balance of the rotor assembly 17a, which unbalance may be rectified by utilization of weights such as shown in Figure 2 at 50.

The highly accurate construction afforded by the present invention enables the designer and user to make extensive use of the present fluid turbine device in that with the present construction, extremely high speeds of engine and load shafting may be safely handled. The vanes are all cut from absolutely uniform sheet stock from a common die, and are therefore of equal weight for dynamic balance.

Attention is directed to the important fact that the toroidal space enclosed between shells 17 and 17a and inner members 18, 18a is completely vaned within that space, and further, that the circumferential boundary of the space is not interrupted or broken at any point, except at the median plane bisecting the torus. This continuity of flow characteristic is extremely important if losses from turbulence and interruption of unitary cross-section flow in the vane pockets is to be avoided. Figures 1 and 2 show clearly the complete sectional filling of the space between shells 17 and 18 by the vanes 19. The hub portion of Figure 1 is equipped with spacer rings 12 and 16 so that the circumferential flow is not altered. This feature is herein stressed in view of the many disclosures in the prior art which show the vanes of similar devices cut away at their inner terminals with the rotor hubs, and which show circumferential voids in the closed fluid circuit about the eye of the torus adjacent the hub.

It has been found by experiment, and by actual experience in a motor car drive that the presence of such voids and interruptions in the liquid flow circuit causes eddies and stagnant areas, as well as compression and decompression effects, all of which reduce the efficiency of the fluid flywheel device. Since energy which is not transmitted from input shaft to output shaft can only be expressed as a heat loss, the present invention, because of the elimination of the above noted undesirable features, makes an important contribution to the art. It makes the closed-circuit fluid turbine clutch for the first time a practical reality. The efficiency as indicated by the torque curve, such as indicated in Figure 4, rises very sharply, regardless of the rate of acceleration of the engine, with no appreciable lag, so that at a speed of 1000 R. P. M. input, for example, the device of the example is capable of transmitting the full torque of the average automobile engine.

This means that the car driver can have the engine throttle wide open, with the fluid flywheel transmitting full power at high efficiency, at any practical engine speed above 1000 R. P. M., for example.

It will be noted that the supply system provided by pump 39 first fills the fluid turbine working space to rated pressure before the check valve 22 furnishes lubrication pressure to the transmission bearings beyond passages 32, 33, 34 and space 35. This eliminates air pockets which may have formed while the device may have been at rest.

Figure 5 is a vertical elevation section of a complete transmission drive unit embodying the present invention. The general transmission arrangement is that of United States application Serial Number 267,024, filed April 10, 1939, now matured as Letters Patent No. 2,211,233, issued August 13, 1940, to O. K. Kelley.

The construction at the left of the figure is the same as in Figure 1.

Central shaft 13 extends to the right, terminating in a pilot bearing 49 in the socket of output shaft 50, and having attached or integral sun gear 51. Surrounding hollow shaft 8 has attached to its carrier flange 52 for planet gears 53, and extends to the right, terminating in splined clutch hub 69.

The hollow shaft 4, transmitting engine power, is integral with annulus gear 54.

The gearing shown is arranged in three groups, a front unit, a rear unit, and a reverse unit. The front unit is composed of meshing annulus 54, planets 53, and sun gear 55, the latter being splined to drum 56 of brake 60. The spindles 57 for planets 53, extend through from carrier flange 52 to clutch hub 58, splined to receive clutch plates 61. The interior circumferential portion of drum 56 is splined to carry mating clutch plates 62.

The rear unit is composed of meshing sun gear 51, planets 63, and annulus gear 64, the drum 65 of which is splined internally for clutch plates 67, mating with clutch plates 68 mounted on hub 69, attached to hollow shaft 8. The external surface of annulus drum 65 is braked by servo-actuated brake 70. The carrier 71 for planets 63 is affixed to, or integral with the transmission output shaft 50.

The reverse unit is composed of meshing annulus gear 73, planets 74, and sun gear 75 fixed to rotate with annulus gear 64 of the rear unit. The carrier 76 for planets 74 is splined to the output shaft 50. Annulus gear 73 is integral with drum 77 supported in bearing 78, and toothed at 79 to engage reverse locking pawl 80, sliding in recess 81 in casing 10. The pawl 80 is released by spring 82 and loaded for engagement with teeth 79 by fluid pressure delivered through pipe 105.

The engine power is applied to the whole assembly through annulus gear 54, constantly rotating with the engine. When brake 60 is applied, sun gear 55 is stopped, furnishing reaction for reduced forward drive of carrier 52, sleeve 8 and impeller 20 of the fluid turbine unit. When the brake 60 is released and the clutch plates 61, 62 are pressed together, a locking couple is established, causing the annulus 54, sun gear 55 and carrier 52 to rotate as one, providing drive at engine speed to sleeve 8 and rotor 20 of the fluid turbine unit.

Alternate energisation of brake 60 or clutch 61, 62 provides therefore low speed drive to the turbine unit or drive at engine speed.

The rear unit is capable of drive when either brake 70 or clutch 67, 68 are energised. Assuming that the engine power may be transmitted through the fluid turbine unit to shaft 13 and sun gear 51, the application of brake 70 will stop annulus gear 64 affording reaction for low speed forward drive of carrier 71, and output shaft 50. Release of brake 70, and energisation of clutch 67, 68 causes annulus gear 64 and shaft 8 to rotate as one so that the net rotation of carrier 71 and output shaft 50 will be the resultant of two components, one derived from rotation of annulus 64 and the other from rotation of sun gear 51.

The reverse, low speed drive is obtained by energisation of brake 60 of the front unit, and pawl 80, which locks annulus 73, to establish reverse gear reaction.

Fluid pressure pipes 101 and 102 of gland 100 lead respectively to cylinders 85 and 90 in drums 56 and 65, for applying controlled fluid pressure to pistons 86 and 91 respectively, in order to energise clutch 61, 62 or clutch 67, 68. Brake plunger cylinders shown in Figure 5a at 87 and 92 and fed by pipes 103 and 104, house pressure actuated pistons for actuating the brakes 60 and 70 in a commonly known manner. The external control system for setting up a combination pattern of driving speed ratios is not a part of the present invention. The following table of speed ratios is given, however, to provide a clear-cut description of the operation obtainable with the combinations of the present invention; the symbol *x* indicating energisation or actuation of the element so marked:

|  | Front Unit | | Rear Unit | | Rev. Unit Pawl |
|---|---|---|---|---|---|
|  | Brake | Clutch | Brake | Clutch |  |
| Low | x |  | x |  |  |
| 2nd |  | x | x |  |  |
| 3rd | x |  |  | x |  |
| High |  | x |  | x |  |
| Reverse | x |  |  |  | x |
| Neutral |  |  |  |  |  |

The direction of movement of lubrication oil from the check valve porting 24 and 27 of Figure 1 through the shaft passages leading to the transmission elements can be followed in Figure 5. Radial passage 27 of Fig. 1 opens into a space between shaft 13 and shaft 8, from whence flow may be directed from radial passage 106 to the front unit gearing of Fig. 5, from radial passage 107 to the members adjacent gland 100, through passage 108 and along passage 110 of shaft 13 to passage 111 feeding the gearing of the rear unit; and through the pilot bearing 49. The system assures that all of the rotating parts are plentifully supplied with lubricant, which because of the rotation of the gears and drums, is thrown out by centrifugal force to the inner walls of the casing 10, whence it drains into the sump to be recirculated by pump 30. The spreading out of the body of oil over the interior of the casing facilitates cooling of the oil, which effect is likewise augmented by the sump pan 10b acting as a radiator.

The method of assembly of the vane, shell and hub elements provides a light weight, compact unit, which is capable of high speeds such as 3600 to 4500 R. P. M., without dynamic unbalance.

The slots 36 and 38 in the members 17 and 11 are cut accurately to accommodate the thickness of the vane elements with just enough clearance to permit the vanes 19 to be slipped into place. The rolling down of the tabs 41, 42 and 43 anchors the vanes in place and supports the whole structure, which has comparative strength to that of a many-spoked wheel.

In the present invention the number of vane pockets and vanes with respect to the collective thicknesses of the vanes determines a factor which is describable as the fineness ratio. For example, the added thicknesses of all of the vanes when compared with the total of 360 degrees, may amount to 30 degrees. The vanes then take up one-twelfth of the total effective face area of the turbine wheel. If, for example, the number of vanes is 48, the ratio of 48 to 30 is 1.6, a value taken as approaching useful efficiency. Now if there were only 30 vanes, the ratio would be 1.0; and if there were only 24, it would be 0.8, a value believed lacking in useful character. Should there be 60 vanes, the fineness ratio would be 2.0, a preferred ratio over either of the above given.

Now if the additive vane thicknesses consumed only 20 degrees (or one-eighteenth), yet there were 48 vanes, the fineness ratio would be 2.4; and if there were 30 vanes, it would be 1.5; 24 vanes would yield the ratio 1.2, and 60 vanes, a fineness ratio of 3.0. The present invention, because of the method of assembly, allows the designer to use very thin blades, and as large a number of vanes as the torque capacity characteristic of the design of the required fluid flywheel calls for. The disclosure herein then permits of a relatively high fineness ratio, which yields a minimum of drag loss at the parting plane between the fluid flywheel rotors. This provides a low unit pressure in each vane pocket also.

The use of a relatively large number of thin, flexible vanes allows the designer to use water, or very light oil as the transfer fluid in the fluid flywheel, and provides a design of extremely low stalling torque.

The feature of high fineness ratio in combination with the feature noted above, of the closed circuit toroidal section, produces a result of unusual utility in that heat losses, intolerable in earlier devices in this art, are now reduced to a minimum, while maintaining the desired low stalling torque.

These considerations apply more particularly to usages of fluid turbine couplings wherein efficiency over a wide speed range is desired as distinct from usages in which one efficiency is made deliberately low over a starting speed range in which large inertias are required to be overcome.

In operation, the hollow shaft 8 receives direct rotation from the engine when clutch 61, 62 of the front unit is engaged and indirect rotation from engine connected drum 3 and shaft 4 when brake 60 is applied and clutch 61, 62 released, and in either case the fluid in the vane pockets of element 20 begins to circulate radially when the engine is accelerated. Since there is a relatively closed fluid circuit, because of spacers 16 and 12, the fluid tends to move about the eye 18—18a of the toroidal space, as seen in Figure 1. The inner curved face of shell 20 guides the fluid to first move longitudinally, and the fluid velocity energy is imparted to the element 21, the fluid returning toward the shaft center as it loses its velocity. At first the resultant rotation of output element and shaft 13 connected to the load is small, and there is a high differential of speed between shafts 8 and 13. As shaft 13 increases in speed, the force generated in the moving torus of fluid increases, therefore the torque capacity of the device as a clutch increases, Figure 4 giving a curve representing an example of the power results obtained.

At some predetermined speed of shaft 8 for a given torque applied to shaft 13, the differential of speed has diminished to a low value, so that the efficiency of the device has attained a correlated high value. Measured efficiencies show results close to 100 per cent, for given constructions, power plants and loads, in normal motor car driving speed ranges.

Due to the accurate contour of the vane pockets and parts 17—18, the fluid passing through from the low to the high velocity space is not subject to voids, or to increases or decreases in cross sectional area of the compartments, therefore there is a minimum of loss ordinarily encountered in such devices resulting from turbulence and skin friction factors.

When the power shaft 1 is idling it will be seen that pump 30 will likewise idle, only delivering sufficient fluid under low pressure to keep the working space between the turbine rotors filled, for efficient operation during the ensuing driving interval. The check valve 22 assists in this action by blocking the outflow of fluid from the working space, by the setting of the check valve spring 22a, so that the pump only has to make up minor leakage losses during the idling period.

It should be made clear that the references in this specification to the resiliency of the rotor construction and its ability to absorb torque impulses or vibrations is due to the fact that with the rolled down vane tabs in the shell and in the core ring, radial tensional stresses in the vanes caused by such impulses, originating in an acceleration or deceleration component applied to one shaft or another, tend to be absorbed if they are of a frequency and energy value within the range of the natural period of the core ring taken as a mass and the vanes as deflecting springs.

It is useful to provide a constant circulatory path for the fluid arranged such that the cross-sectional areas at any point in the path are equivalent or equal. Without the closed, continuous low velocity area, provided by the spacer rings 12—16, and the described means for shaping the path of flow between the circular external shells 20—21 and their inner members 18—18a, the noted benefits in efficiency derived are not obtainable.

The further improvement of positive fluid circulation under controlled pressure for both lubrication and cooling, effective at all times when the engine is running, is believed to be of unusual utility. In this connection, it is conceded that ordinary pump feed to fluid turbine devices is old in the art, but the present system of the invention provides two features not heretofore described, namely, the method of sustaining a given pressure level at all times in the turbine, and the exhausting of the spent pressure through lubrication passages to a reservoir of extended heat radiation capacity.

The preceding demonstration has disclosed a unique method of confining the working fluid in the turbine in a completely closed and voidless toroidal space; it has shown a structure yielding a high fineness ratio; and a method of assembly from stamped sheet parts which yields exceptional lightness, strength and inherent dynamic balance while utilizing the closure members for the toroidal circuit as clamps for the vanes. The structure disclosed lends itself to application of torsional vibration absorption technique as described herein.

The advantages of these disclosures are believed obvious to those skilled in the art, and are thought to represent substantial contributions thereto. It should be understood that the illustrative form is not in any sense restrictive, and that the invention may be employed in many ways within the scope of the appended claims.

Having herein fully described the invention, what I claim as new and desire to secure by Letters Patent is:

1. In power devices for motor vehicles, a power shaft and a concentric load shaft, facing turbine rotor members secured to each of said shafts for transmitting variable torque therebetween, fixed radial vanes in said members each of which extends to the parting zone therebetween, a toroidal fluid circulation space included between the members about which the fluid may circulate rotationally and circumferentially, a power driven drum enclosing said members providing an input fluid pressure space therefor, hubs for each of said members, spacer elements on each of said hubs extending to said parting zone, for closing the contour of said toroidal space, a fluid pressure supply means connected to the interior of said drum for creating uniform pressure therein tending to oppose axial separation of said members, and control means responding only to the pressure within said space and located in one of said hubs for relieving pressure therefrom at above a predetermined value for preventing axial separation of said members and maintaining the said space completely filled during rotation of said drum.

2. In a fluid coupling for driving and driven members, a flywheel structure secured to said driving member, a drum attached to said flywheel structure adapted to be connected to and disconnected from a concentric hollow shaft, a shaft within said hollow shaft, axially spaced facing fluid rotors attached to each of said shafts, said rotors enclosing a substantially closed toroidal fluid circuit space, hubs for each of said rotors for attachment to said shafts respectively, the inner surfaces of said hubs providing flow guidance in said space, a fluid supply space enclosed within said drum and communicating with the axial space between said rotors, the pressure of said supply space being operative to oppose axial separation of said rotors, fluid pressure supply means driven by rotation of said drum adapted to furnish fluid under pressure to said rotors by delivery to the space enclosed by said drum, and control means responsive to the pressure of said toroidal space for maintaining the working pressure at all times when said supply means is operating.

3. In fluid coupling turbines, coacting axially spaced driving and driven fluid rotor members each rotating with a shaft for transmitting variable torque therebetween, hubs for each of said members for attachment to its respective shaft, a pump driven by means rotating with the driving member, passages connecting said pump with the working space between said members, an external rotatable drum forming a fluid inlet delivery space for the fluid pressure developed by said pump and enclosing said members, said delivery space substantially enclosing the members so as to provide pressure opposing their separation and opening to the axial space between the members, outlet passages in one of said hubs for relief of pressure from the working space between said members, and a check valve located in said hub immediately adjacent the outlet passages and subject only to the pressure developed within the working space of said members for relieving all pressure in said space above a given value, whereby the working space remains filled at all times when rotation is applied to said pump.

4. In fluid turbine driving devices, a power shaft, a load shaft, a primary shaft, turbine hubs fastened to each of said power and load shafts, coacting fluid rotor members mounted on said hubs for transmitting variable torque between the said shafts and axially spaced to form a parting zone between the members, said members being formed to include a vaned working space, a pump driven by rotation of said primary shaft, a drum surrounding said members and rotatable by said primary shaft at varying speed ratios with respect to the speeds of either of said shafts, the space between the drum and members constituting the pressure delivery space open to said parting zone, pressure delivery passages including passages in said hubs connecting said pump with said drum, and control means mounted in one of said hubs and responding to the pressure of said working space for maintaining the fluid working space between said member under a given positive fluid pressure at all times when said pump is rotating, and for opposing the effect of separation of said members by pressure within said working space.

5. In fluid turbine drive devices, for motor vehicles, a primary shaft and a secondary shaft, coacting facing vaned members attached one to each shaft for dynamic transfer of torque by fluid circulated in the vaned working space between the members with rotation applied to either shaft such that during operation the said working space generates a high pressure peripheral zone and a lower pressure central zone the pressure of which tends to separate the members axially, a fluid reservoir, a fluid supply means adapted to draw fluid from said reservoir and deliver it under pressure to the working space between said vaned members through a fluid delivery space external to said members, and control means located adjacent the low pressure zone of said working space effective to regulate the degree of pressure of said working space and that tending to separate the members, said fluid control means constantly changing the fluid of the said working space at all times while said primary shaft delivers torque to said secondary shaft.

6. In fluid turbine drive devices, in combination, a power shaft, a load shaft, rotor hubs secured to each of said shafts, coacting fluid rotors mounted to rotate with each hub to clutch the shafts together by turbine action derived from power delivered by said power shaft, a vaned fluid turbine pressure working space between said rotors in which axial force tending to separate them is generated, a check valve mounted in one of said hubs and connected to said working space, a circuit of fluid pressure supply for maintaining the working space between said rotors under super-atmospheric pressure comprising a pump driven by rotation of said power shaft, suction passages to said pump, pressure passages connecting the pump with said working space, pressure relief passages leading to said check valve and from said check valve to lubrication passages including passages in one of said hubs, a reservoir serving as a supply for said pump, and means regulating the operation of said check valve effective to establish a constantly active circulation of fluid through said circuit when said pump is operating, and to limit the said axial pressure tending to separate said rotors.

7. In power transmission devices, driving and driven shafts, facing rotor members radially vaned to a narrow radial parting zone between them to form a fluid working chamber, a driving drum adapted to drive said driving shaft located external to said members and enclosing them, the intervening space within said drum forming a fluid pressure reservoir formed to oppose separation of said members by pressure within said chamber, a fluid supply system for said chamber including a splined sleeve and a pump driven by said drum and a fluid sump, splined hubs for attaching said members respectively to said shafts, fluid feed passages connecting said pump with said intervening space including feed passages in the splining for the said sleeve connected to the output of said pump, fluid exhaust passages connecting the said working chamber with the said sump and including a passage in the said driven hub and a central passage in a portion of said driven shaft, and a valve rotating with the said driven hub and located between the said last named hub and shaft passages, said valve being arranged to respond solely to the pressure of said working chamber and that provided by said pump for limiting the pressure to which it responds, in providing an intermittent but continuing flow of fluid between said chamber and said sump during rotation of said driving shaft.

8. In fluid drive devices, the combination of facing vaned rotors, one driving and the other driven, there being included between them a fluid working space opening radially and normally operative to exert pressure axially in a direction to separate the rotors, an overhanging pressure-sealed drum, adapted to house said rotors and constituting the pressure feed space open to said working space and arranged to provide fluid pressure opposing the said separating pressure within said working space, and fluid pressure supply and control means effective to provide a body of fluid constantly moving to the interior of said drum to said working space and exhausting therefrom during the drive interval of said rotors.

EARL A. THOMPSON.

REFERENCES CITED

The following references are of record in the file of this patent:

UNITED STATES PATENTS

| Number | Name | Date |
|---|---|---|
| 1,270,323 | Radcliffe | June 25, 1918 |
| 1,327,080 | Brown | Jan. 6, 1920 |
| 1,640,608 | Klimek | Aug. 30, 1927 |
| 1,766,520 | Klimek | June 24, 1930 |
| 1,873,688 | Walker | Aug. 23, 1932 |
| 2,074,170 | Dunn | Mar. 16, 1937 |
| 2,077,580 | Patterson | Apr. 20, 1937 |
| 2,140,324 | Lysholm | Dec. 13, 1938 |
| 2,144,256 | Duffield | Jan. 17, 1939 |
| 2,149,117 | Dodge et al. | Feb. 28, 1939 |
| 2,154,882 | Yoxall | Apr. 18, 1939 |
| 2,168,862 | De Lavaud | Aug. 8, 1939 |
| 2,168,863 | De Lavaud | Aug. 8, 1939 |
| 2,176,138 | Kelley | Oct. 17, 1939 |
| 2,182,621 | Dodge | Dec. 5, 1939 |
| 2,190,830 | Dodge | Feb. 20, 1940 |
| 2,190,831 | Dodge | Feb. 20, 1940 |
| 2,200,596 | Dodge | May 14, 1940 |
| 2,203,177 | Patterson | June 4, 1940 |
| 2,211,233 | Kelley | Aug. 13, 1940 |
| 2,235,672 | Dodge | Mar. 18, 1941 |
| 2,270,536 | Lenning | Jan. 20, 1942 |